United States Patent Office 3,421,825
Patented Jan. 14, 1969

3,421,825
ELECTRIC SPARK IGNITION UNITS
William Henry Maycock, Coventry, England, assignor to Associated Electric Industries Limited, London, England, a British company
Filed May 31, 1966, Ser. No. 553,813
Claims priority, application Great Britain, June 3, 1965, 23,751/65
U.S. Cl. 431—208      8 Claims
Int. Cl. F23d 11/00; F23q 7/06; F02p 1/00

ABSTRACT OF THE DISCLOSURE

A solid state ignition unit, mounted on a turbine is cooled by the liquid fuel utilized to feed the engine turbine.

---

This invention relates to electric spark ignition units, especially but not exclusively for the starting and relighting of aircraft gas turbines.

It has been established that the ambient air temperature surrounding the ignition units in high speed aircraft installations can be in excess of 100° C.

In order to provide ignition units which will withstand surrounding ambient temperatures of this order, expensive materials and in some cases heavy ones, are required.

According to the present invention, there is provided an electric spark ignition unit comprising a casing, ignition circuit components mounted in the casing, liquid fuel inlet means leading to said components and liquid fuel outlet means leading from said components for circulation of liquid fuel directly over said components.

In use in a turbine or engine, the spark ignition unit may be in a main fuel line or by-pass thereto with the fuel inlet means of the casing fed from a fuel pump and the outlet means of the casing connected to the turbine or engine.

The invention also consists of a method of cooling an electric spark ignition unit consisting of passing liquid fuel through a casing of the unit in direct contact with ignition circuit components in the casing, which components are of materials compatible with the fuel.

A typical fuel for turbines is kerosene or a kerosene based fuel and in use, insulating materials which would be attacked or dissovled in the fuel must not be used in the unit.

Furthermore, where it is necessary to convert D.C. to A.C., this is done by a static, i.e. transistorised circuit, as separable contacts must not be included within the casing of the unit.

Two embodiments of high energy electric spark ignition unit suitable for an aircraft gas turbine will now be described by way of example with reference to the accompanying drawings, in which FIG. 1 is a plan view of the unit with the top of the casing partly cut away and the casing partly in section on the line I—I of FIG. 3, FIG. 2 is a section on the line II—II of FIG. 3, FIG. 3 is an end view of the casing.

Figure 1:
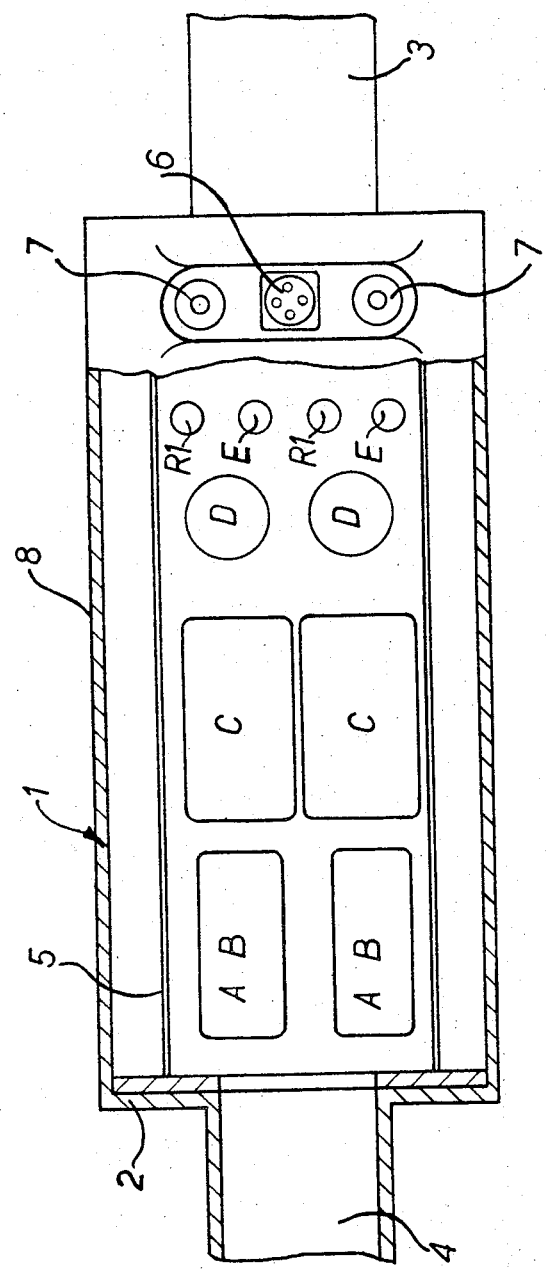
Figure 2:
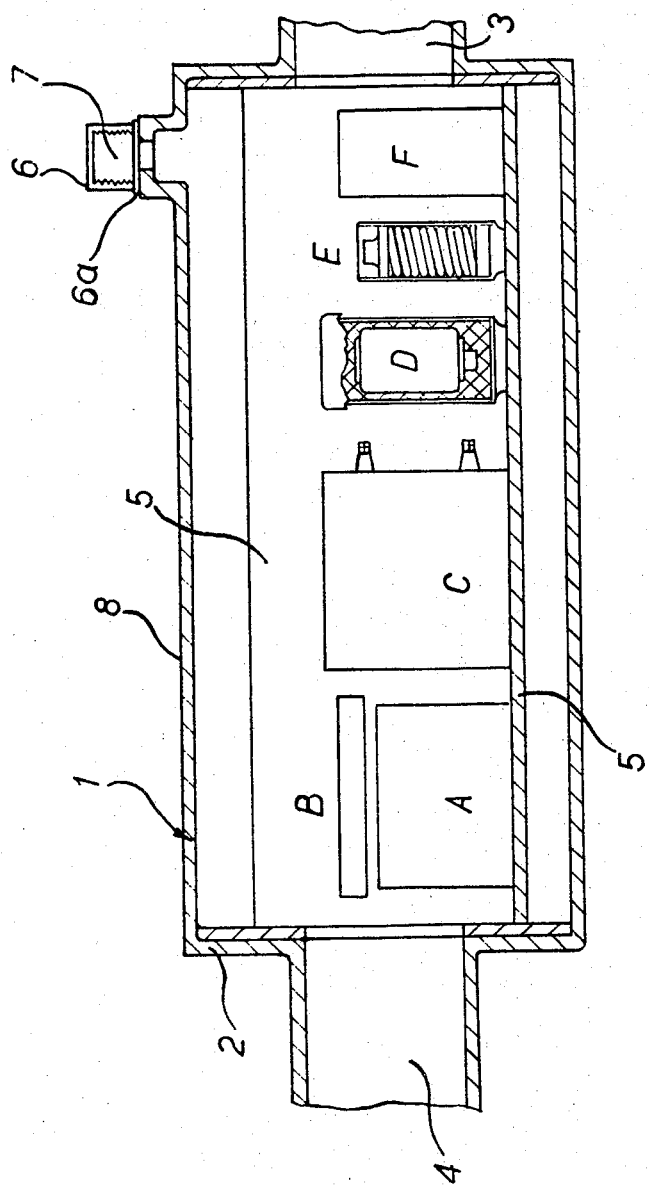
Figure 3:
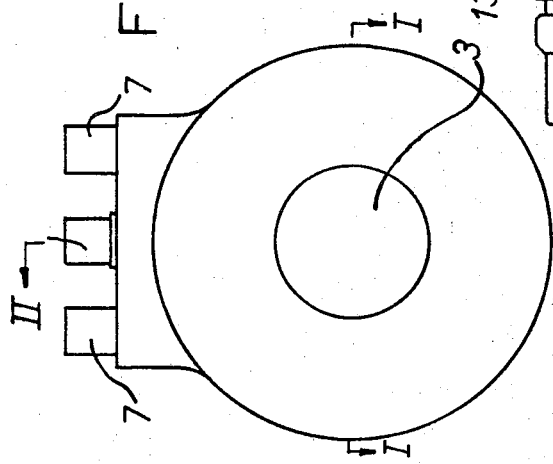

In FIGS. 1–5 of the drawing, there is shown a high energy electric spark ignition twin channel unit operable from an A.C.

Figure 4:
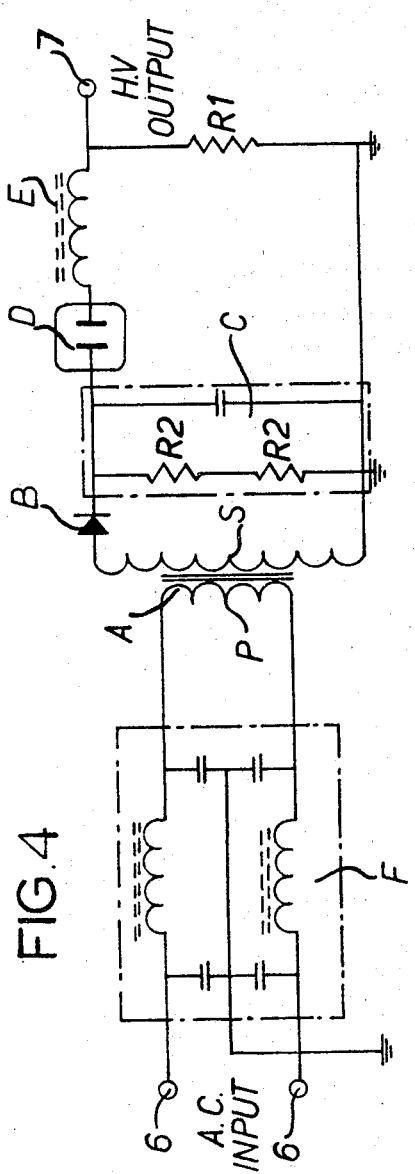
FIG. 4 is a circuit diagram of ignition components, of each channel of the unit when operable from an A.C. supply.

The unit comprises a casing 1 including end plates 2 welded or brazed to a main cylindrical body 8 of the casing, to form a liquid fuel tight container apart from a liquid fuel inlet pipe at 3 and a liquid fuel outlet pipe at 4. The fuel inlet and outlet pipes 3 and 4 both lead to and from ignition circuit components labeled A–F inclusive (FIG. 4). These components are mounted on a U shaped chassis 5 in the casing.

A terminal plate 6a is mounted on the outside of the casing 1 and carries an input plug 6 and sealed high tension output terminals 7, one for each channel of the twin unit.

The circuit components are conventional and consist of a step-up transformer A, a high voltage storage capacitor unit C, a sealed discharge cap D, discharge inductor E and a radio noise suppressor F. The circuit diagram of these components is shown in FIG. 4. The transformer primary P is supplied from A.C. input terminals 6 through leads containing the radio noise suppressor unit F. The secondary S of the transformer A is connected to charge the capacitor C, connected across the secondary through a rectifier B so as to discharge through the discharge cap D to a turbine surface discharge plug (not shown) connected to the high voltage output terminal 7. Protective resistors R1 are connected across the high voltage output to limit the value to which the capacitor voltage can rise should an open circuit occur in the high voltage, and discharge resistors R2 are connected across the capacitor C to ensure dissipation of its stored energy if it is left charged when not in use. The resistors R2 are contained in the reservoir capacitor unit C, as indicated by the dotted line forming a block around them in FIG. 4.

Figure 5:
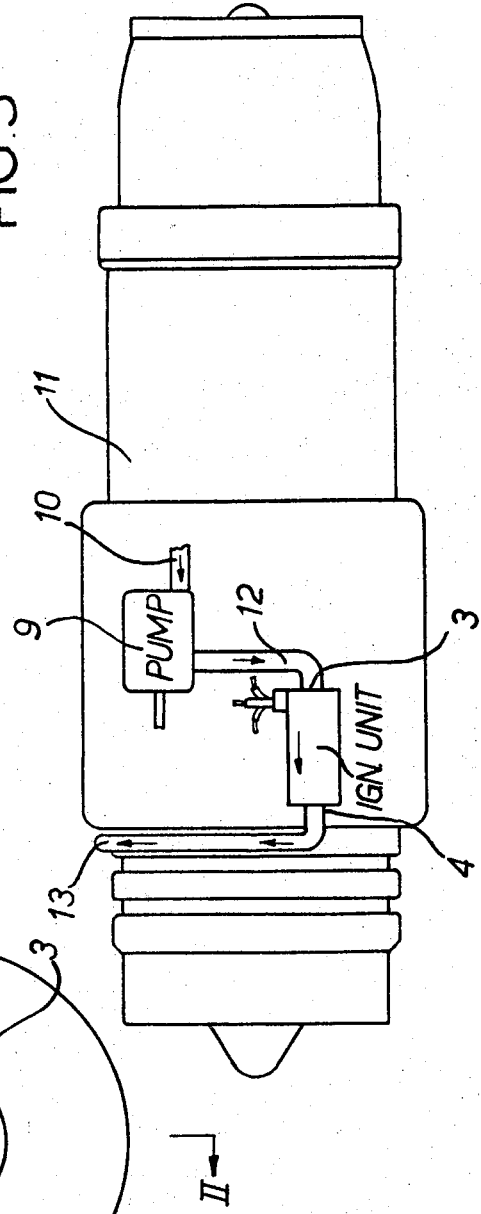
FIG. 5 is a schematic representation of the location of the unit in the turbine fuel system and FIG. 6 is a circuit diagram of an alternative circuit of each channel when the unit is operable from a D.C. supply.

In use, the ignition unit is located in the fuel supply to the turbine as illustrated in FIG. 5. A fuel pump 9 connected by a pipe 10 to a fuel tank (not shown) pumps fuel for the turbine 11 through pipe 12 to the ignition unit and through the outlet 4 and pipe 3 to the main combustion chamber of the turbine (not shown).

Alternatively, the ignition unit may be located in a by-pass to the main fuel feed between the pump and the main combustion chamber. In this case, the inlet 3 and outlet 4 may be of a reduced diameter.

Figure 6:
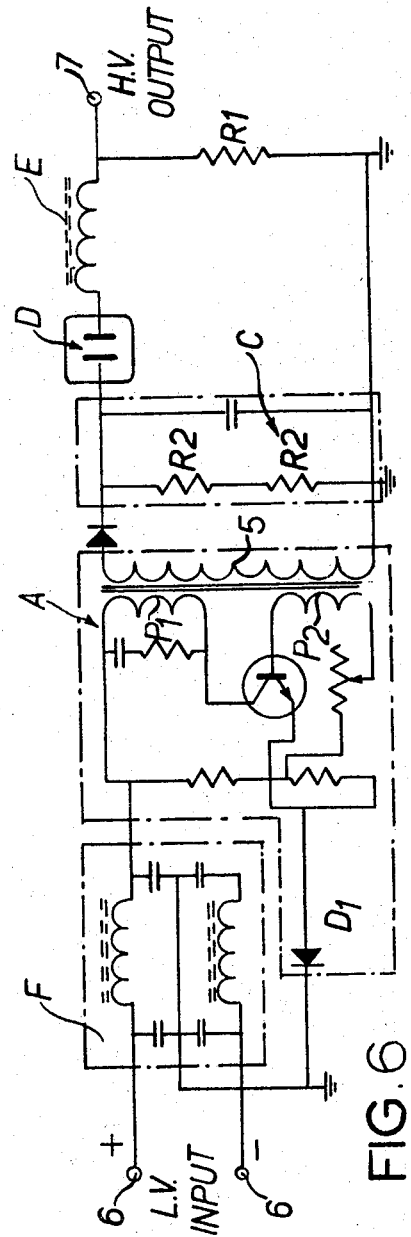

In FIG. 6, there is shown a modified circuit diagram in which a D.C.–A.C. transistorized convertor unit is connected between the input terminals 6 and the primary circuits P1 and P2 of the transformer. The circuit is conventional and diode D1 is included to prevent damage to the transistors should the input terminals be connected up the wrong way round.

Although a twin channel unit has been described, the invention may be equally be applied to a single channel unit, which will have only one lot of ignition components A–F and one high voltage output terminal 7.

What I claim is:

1. In combination with a fuel consumption device, an electric spark ignition unit, said unit comprising a casing, a chassis supported in the casing in spaced relationship to the casing, spark ignition circuit components mounted on the chassis, low voltage input terminal means on the casing, electrical connecting means between the low voltage input terminal means and an input to the spark ignition circuit components, higher voltage output terminal means on the casing, electrical connecting means between an output of the spark ignition circuit and the higher voltage output terminal means, fuel inlet means for leading to the spark ignition circuit components fuel at a temperature lower than the ambient temperature and fuel outlet means leading the fuel from the spark ignition circuit components to said fuel consumption device.

2. The combination set forth in claim 1 in which said casing is in the direct fuel feed line between the source of fuel and the fuel consumption device.

3. The combination set forth in claim 1 in which said casing is in a branch feed line between the source of fuel and the fuel consumption device.

4. A combination as claimed in claim 1 in which the spark ignition circuit components include a step up transformer the primary of which is supplied from the low voltage input terminal means, the secondary of the transformer being connected to charge a capacitor connected across its secondary through a rectifier, protective resistors being connected across the output to the spark ignition circuit components to limit the value to which the capacitor voltage can rise should an open circuit occur in the output and discharge resistors connected across the capacitor to ensure dissipation of its stored energy if left charged when not in use.

5. A combination as claimed in claim 4 in which radio noise suppressor means are provided in the electrical connecting means between the low voltage input terminal means and an input of the step up transformer.

6. A combination as claimed in claim 4 in which a D.C. to A.C. transistorized converter unit is provided in the casing and connected between the low voltage input terminal means and the input to the step up transformer.

7. A combination as claimed in claim 6 in which radio noise suppressor means are provided in the electrical connecting means between the low voltage input terminal means and the input to the D.C. to A.C. transistorized converter unit.

8. A combination as claimed in claim 1 in which the spark ignition circuit components and output terminal means are arranged to provide a twin-channel spark ignition unit.

References Cited

UNITED STATES PATENTS

| | | | |
|---|---|---|---|
| 2,298,214 | 10/1942 | Jones | 123—133 XR |
| 2,963,014 | 12/1960 | Voelcker | 123—139 |
| 3,035,108 | 5/1962 | Kaehni | 123—148 |

OTHER REFERENCES

Generation of Electric Power in Space Vehicles by Means of a Cryogenic Fuel Powered Engine, by Harris Howard et. al., Air Transportation Conference of AIEE 6–24, 26–1959 Paper No. 59–982 (FIG. 8 and p. 4).

LAURENCE M. GOODRIDGE, *Primary Examiner.*

U.S. Cl. X.R.

431—263; 60—39.46; 123—148, 41.42